(12) United States Patent
Jeon (10) Patent No.: US 7,959,244 B2
(45) Date of Patent: Jun. 14, 2011

(54) DATA INTERFACING APPARATUS OF PRINT HEAD CHIP

(75) Inventor: Seong-nam Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 538 days.

(21) Appl. No.: 11/767,690

(22) Filed: Jun. 25, 2007

(65) Prior Publication Data

US 2008/0174616 A1 Jul. 24, 2008

(30) Foreign Application Priority Data

Jan. 19, 2007 (KR) .................. 10-2007-0006295

(51) Int. Cl.
*B41J 29/38* (2006.01)
*H03K 17/16* (2006.01)

(52) U.S. Cl. ................... 347/5; 347/9; 326/30
(58) Field of Classification Search ............ 347/5, 9; 340/2.8

See application file for complete search history.

(56) References Cited

U.S. PATENT DOCUMENTS

| 5,828,386 A * | 10/1998 | Okada et al. ............ 347/9 |
| 2002/0093248 A1* | 7/2002 | Takahashi et al. ........ 307/43 |
| 2005/0110814 A1* | 5/2005 | Imai ..................... 347/5 |
| 2007/0139071 A1* | 6/2007 | Nguyen .................. 326/30 |

* cited by examiner

*Primary Examiner* — Matthew Luu
*Assistant Examiner* — Shelby Fidler
(74) *Attorney, Agent, or Firm* — Stanzione & Kim, LLP (57) ABSTRACT

A data interfacing apparatus and method of a print head chip are provided. The data interfacing apparatus includes a drive module to output a low-speed signal with a slow transmission speed and a high-speed signal requiring a fast transmission speed, a connection cable transmitting the low-speed signal and the high-speed signal, and a print head chip to operate in response to the low-speed signal and the high-speed signal transmitted through the connection cable, wherein the drive module includes multiplexers to perform a switching operation so that the connection cable is earthed to a ground in response to the high-speed signal, and wherein the print head chip includes de-multiplexers to perform a switching operation in response to the operation of the multiplexers.

18 Claims, 5 Drawing Sheets

<WHEN DIFFERENTIAL SIGNAL RETURN PATH IS OBTAINED>

FIG. 5B

<WHEN DIFFERENTIAL SIGNAL RETURN PATH IS NOT OBTAINED>

FIG. 6

DATA INTERFACING APPARATUS OF PRINT HEAD CHIP

CROSS-REFERENCE TO RELATED APPLICATIONS

This application claims priority under 35 U.S.C. §119(a) from Korean Patent Application No. 10-2007-0006295, filed on Jan. 19, 2007, in the Korean Intellectual Property Office, the disclosure of which is incorporated herein in its entirety by reference.

BACKGROUND OF THE INVENTION

1. Field of the Invention

The present general inventive concept relates to transmission of data to a print head chip, and more particularly, to a data interfacing apparatus and method of a print head chip by which a number of signal traces and ground traces are reduced and signal distortion caused by signal transmission is reduced.

2. Description of the Related Art

It is very important to process signals and grounds of a system according to low-speed signals and high-speed signals.

Figure 1:
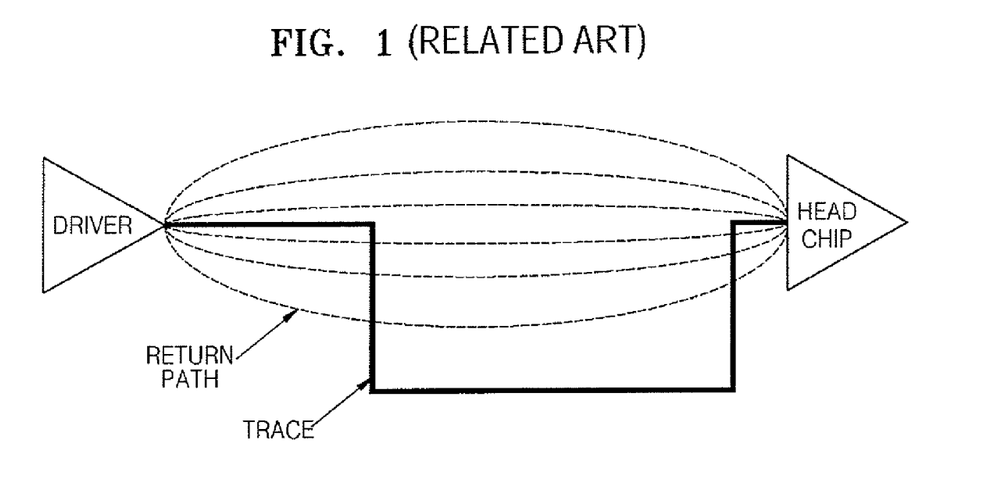
FIG. 1 is a diagram of return paths formed by the transmission of a low-speed signal between a driver and a head chip.

FIG. 1 is a diagram of return paths formed by transmission of a low-speed signal between a driver and a head chip. Referring to FIG. 1, the return paths in dotted lines are formed on an inner layer or plane. At low speed the return paths are formed closer to a point of least resistance.

Figure 2:
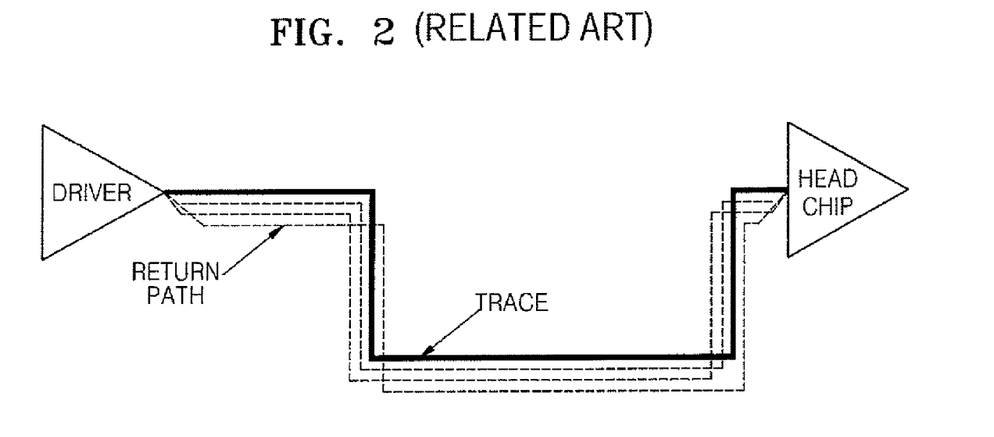
FIG. 2 is a diagram of return paths by the transmission of a high-speed signal between a driver and a head chip.

FIG. 2 is a diagram of return paths formed by transmission of a high-speed signal between a driver and a head chip. Referring to FIG. 2, the return paths in dotted lines are formed on an inner layer or plane. At high speed the return paths are formed closer to a trace of the high-speed signal. That is, at high speed the return paths are formed closer to a point of lowest inductance. In more detail, the return paths have a pattern of a mirror right below the trace of the high-speed signal and define a smallest loop area. However, if the return paths are not obtained between the driver and the head chip, the transmission of the high-speed signal causes signal distortion and noise.

Figure 3:
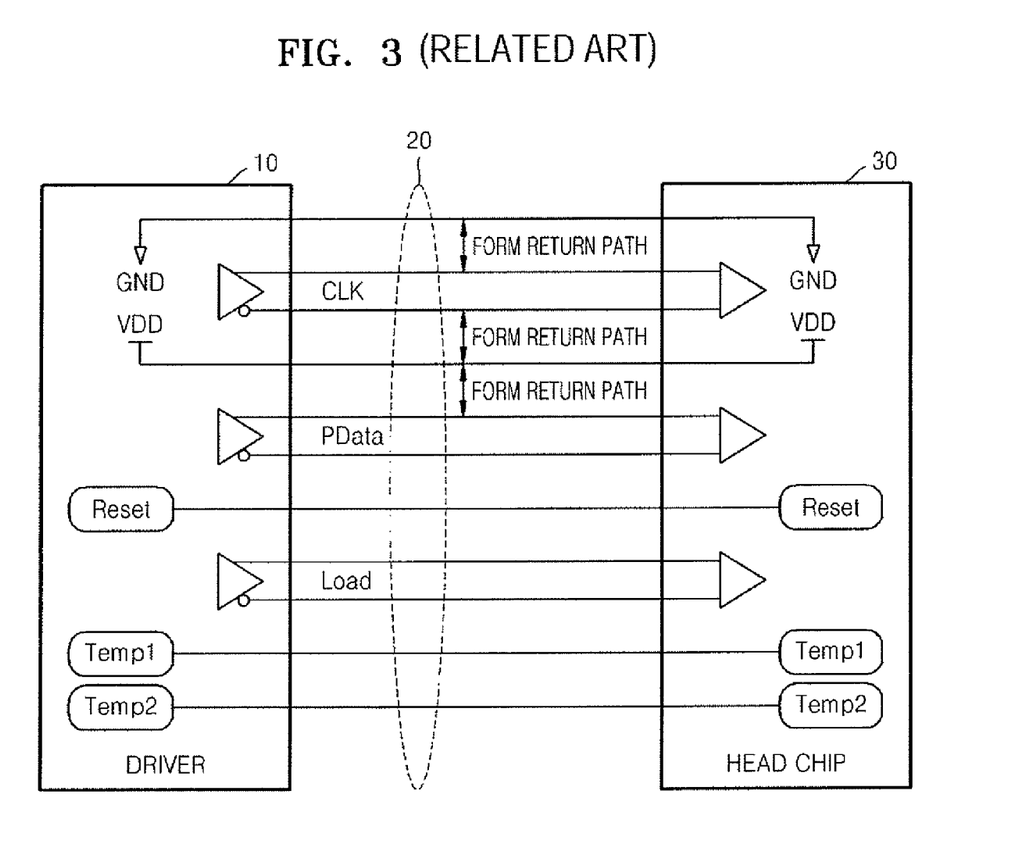
FIG. 3 is a diagram of components used to transmit signals between a driver and a head chip.

FIG. 3 is a diagram of components used to transmit signals between a driver 10 and a head chip 30. Referring to FIG. 3, a reset signal Reset and two temperature sensing signals Temp1 and Temp2, which are low-speed signals, are transmitted to the head chip 30 from the driver 10. A clock signal CLK, a print data signal PData, and a load signal Load, which are high-speed signals, are transmitted to the head chip 30 from the driver 10. However, a return current path is formed between the clock signal CLK and a print data plus signal PData, which reduces possibility of the occurrence of signal distortion. However, a return current path is not formed between a print data minus signal PData, which is another high-speed signal, and the load signal Load, which increase possibility of the occurrence of signal distortion when the load signal Load is transmitted to the head chip 30 from the driver 10.

To prevent the occurrence of signal distortion, the return current path can be formed in all signal traces to transmit the high-speed signals such as the load signal Load, etc. However, this solution requires increasing the number of pins of the driver 10 and the number of cables 20 corresponding to signal traces and ground traces which inevitably increases costs and reduces transmission efficiency.

SUMMARY OF THE INVENTION

The present general inventive concept provides a data interfacing apparatus and method of a print head chip by which signal distortion caused by the transmission of a high-speed signal is reduced by forming a return path by a ground trace using a multiplexer MUX.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a data interfacing apparatus of a print head chip, including a drive module to output a low-speed signal with a slow transmission speed and a high-speed signal requiring a fast transmission speed, a connection cable to transmit the low-speed signal and the high-speed signal, and a print head chip to operate in response to the low-speed signal and the high-speed signal transmitted through the connection cable, wherein the drive module includes multiplexers to perform a switching operation so that the connection cable is earthed to a ground in response to the high-speed signal, and wherein the print head chip includes de-multiplexers to perform a switching operation in response to the operation of the multiplexers.

The foregoing and/or other aspects and utilities of the present general inventive concept may be achieved by providing a data interfacing method of a print head chip including a drive module to output a low-speed signal with a slow transmission speed and a high-speed signal requiring a fast transmission speed, a connection cable to transmit the low-speed signal and the high-speed signal, and a print head chip to operate in response to the low-speed signal and the high-speed signal transmitted through the connection cable, the method including determining whether the low-speed signal or the high-speed signal is output, and if it is determined that the high-speed signal is output, a switching operation is performed so that the connection cable is earthed to a ground.

The foregoing and/or other aspects and utilities of the present general inventive concept may be achieved by providing a connection cable usable with a data interfacing apparatus having a drive module and a print head chip, including a clock trace to transmit a clock signal as a high speed signal, a data trace to transmit a data signal as the high speed signal, a load trace to transmit a local signal as the high speed signal, a power trace disposed between the clock trace and the data trace to transmit a power signal as a lower speed signal, a multiplexed trace disposed between the data trace and a priority of the load trace to selectively transmit a ground signal and a temperature signal as the low speed signal, a second multiplexed trace disposed the other portion of the load trace to selectively transmit a ground signal and a second temperature signal as the low speed signal, and a control signal trance to transmit a control signal representing one of transmitters of the ground and temperature signals of the multiplexed traces.

The foregoing and/or other aspects and utilities of the present general inventive concept may be achieved by providing a data interfacing apparatus, including a drive module having a port to output a high speed signal, having another port to output a ground signal according to a first state of the high speed signal of the port and to output a low speed signal according to a second state of the high speed signal of the port, such that a return current path is formed, and having a control port to output a control signal indicating one of the ground signal and the low speed signal of the another port.

The foregoing and/or other aspects and utilities of the present general inventive concept may be achieved by providing a data interfacing apparatus, including a print head chip having a port to receive a high speed signal, having another port to receive a ground signal according to a first state of the high speed signal and to receive a low speed signal according to a second state of the high speed signal of the port, such that a return current path is formed, and having a control port to receive a control signal indicating one of the ground signal and the low speed signal of another port.

The foregoing and/or other aspects and utilities of the present general inventive concept may be achieved by providing a data interfacing apparatus, including a drive module having a plurality ports to generate a high speed signal, and to selectively generate a ground signal and a low speed signal to form a return current path with the high speed signal, a print head chip having a plurality ports to receive the high speed signal and one of the ground signal and the low speed signal from respectively ones of the plurality ports, and a cable having a plurality of traces to connect corresponding ones of the plurality of ports of the drive module and the print head chip.

The drive module may include a control port to generate a control signal indicating generating of one of a ground signal and a low speed signal of at least one of the plurality of ports according to a state of the high speed signal and the print head chip may include another control port to receive the control signal.

The drive module may include a multiplexer to select one of the ground signal and the low speed signal according to a state of the high speed signal and the print head chip may include a de-multiplexer to receive the one of the ground signal and the low speed signal.

The foregoing and/or other aspects and utilities of the present general inventive concept may be achieved by providing a data interfacing apparatus, including a drive module to output a low-speed signal with a slow transmission speed and a high-speed signal with a fast transmission speed wherein a first switching operation is performed in response to the high-speed signal, a connection cable to transmit the low-speed signal and the high-speed signal wherein the connection cable is earthed to a ground during the first switching operation, and a print head chip to perform a second switching operation in response to the first switching operation.

The print head chip may operate in response to the low-speed signal and the high-speed signal transmitted through the connection cable.

The drive module may include multiplexers to perform the first switching and the print head chip comprises de-multiplexers to perform the second switching operation.

The connection cable may function as a first return path of the high speed signal when the connection cable is earthed to the ground, and may function as a second return path of the high speed signal when the connection cable supplies power to the print head chip.

The drive module may determine in advance whether the high-speed output signal or the low speed signal was output.

The connection cable may perform a third switching operation to transmit the low-speed signal if it is determined that the low-speed signal is output.

The foregoing and/or other aspects and utilities of the present general inventive concept may be achieved by providing a data interfacing method of a print head chip, the method including outputting a low-speed signal with a slow transmission speed, outputting a high-speed signal with a fast transmission speed, performing a first switching operation in response to the high-speed signal, transmitting the low-speed signal and the high-speed signal through a connection cable, wherein the connection cable is earthed to a ground during the first switching operation; and performing a second switching operation in response to the first switching operation.

The method may further include determining in advance whether the high-speed output signal or the low speed signal was output.

The method may further include performing a third switching operation to transmit the low-speed signal if it is determined that the low-speed signal is output.

The foregoing and/or other aspects and utilities of the present general inventive concept may be achieved by providing a computer readable recording medium having embodied thereon a computer program to execute a method of a print head chip, the method including outputting a low-speed signal with a slow transmission speed, outputting a high-speed signal with a fast transmission speed, performing a first switching operation in response to the high-speed signal, transmitting the low-speed signal and the high-speed signal through a connection cable, wherein the connection cable is earthed to a ground during the first switching operation, and performing a second switching operation in response to the first switching operation.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 4:
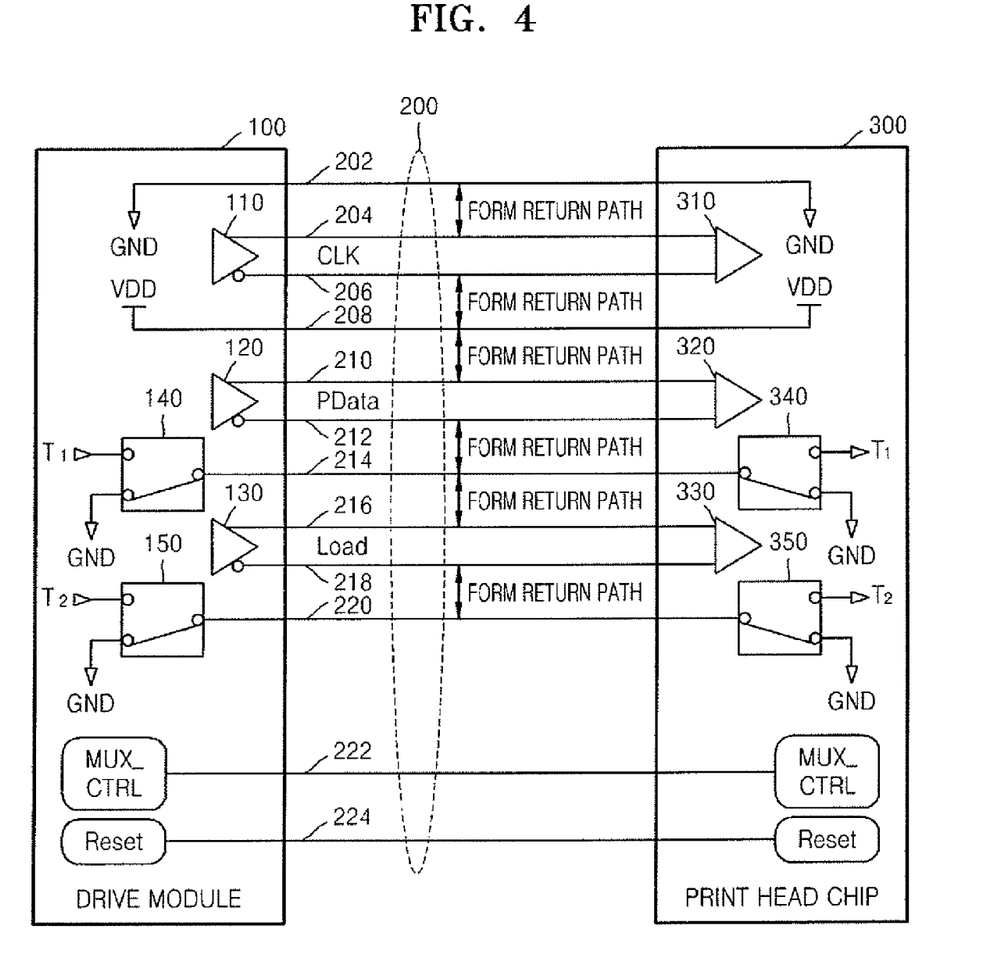
FIG. 4 is a diagram of a data interfacing apparatus of a print head chip according to an embodiment of the present general inventive concept.

FIG. 4 is a diagram of a data interfacing apparatus of a print head chip 300 according to an embodiment of the present general inventive concept. Referring to FIG. 4, the data interfacing apparatus includes a drive module 100, first and second multiplexers 140 and 150, a connection cable 200, the print head chip 300, and first and second de-multiplexers 340 and 350. The print head chip 300 may be usable with an image forming apparatus and may include nozzles to eject ink to print an image according to data received from the driving module 100 through the connection cable 200. However, the data interfacing apparatus is not limited therein. The data interfacing apparatus may include a driver, a driven device, and a cable connected therebetween as illustrated in FIG. 3.

The drive module 100 outputs a low-speed signal with a slow transmission speed and a high-speed signal requiring a fast transmission speed. The connection cable 200 transmits the low-speed signal and the high-speed signal output by the drive module 100 to the print head chip 300. The print head chip 300 operates in response to the low-speed signal and the high-speed signal transmitted through the connection cable 200.

The above components will now be described in detail.

The drive module 100 outputs a clock signal CLK, a print data signal PData, and a load signal Load as high-speed signals. The clock signal CLK is initially synchronized with the print data signal PData and the load signal Load. The load signal Load indicates the start and end of the transmission of data. The drive module 100 inputs or outputs two temperature sensing signals T1 and T2 or a reset signal Reset as low-speed signals.

The clock signal CLK, which is a differential signal (i.e., two complementary signals sent on two separate wires), is output by a first output port 110 of the driver module 100, and is input into a first input port 310 of the print head chip 300 through a trace 204 of the connection cable 200, so that a trace 202 which is earthed to a ground GND functions as a return path of the clock signal CLK. The clock signal CLK can be transmitted to the print head chip 300 through another trace 206 of the connection cable 200, so that a trace 208 that supplies power to the print head chip 300 functions as another return path of the clock signal CLK.

The print data signal PData, which is a differential signal, is output by a second output port 120 of the driver module 100 and is input into a second input port 320 of the print head chip 300 through a trace 210 of the connection cable 200, so that the trace 208 that supplies power to the print head chip 300 functions as a return path of the print data signal PData. The print data signal PData can be transmitted to the print head chip 300 through another trace 212 of the connection cable 200, so that a trace 214 of the connection cable 200 that transmits a low-speed signal functions as a return path of the print data signal PData.

Accordingly, the first multiplexer 140 performs a switching operation so that the trace 214 that transmits the temperature sensing signal T1, which is the low-speed signal, can be earthed to the ground GND in response to the print data signal PData, which is the high-speed signal. When the second output port 120 outputs no signal or a low-speed signal, the first multiplexer 140 is switched on with a terminal capable of receiving the low-speed signal in order to transmit the low-speed signal corresponding to the temperature sensing signal T1 to the print head chip 300.

However, when the second output port 120 outputs the high-speed signal such as the print data signal PData, the first multiplexer 140 is switched off with the terminal capable of receiving the low-speed signal and is earthed to the ground GND in order to form a return path of the high-speed signal. If the print head chip 300 receives a switching signal MUX_CTRL indicating that the first multiplexer 140 is earthed to the ground GND through a signal trace 222, the first de-multiplexer 340 included in the print head chip 300 is earthed to the ground GND in response to the switching signal MUX_CTRL. That is, the trace 214 that is earthed to the ground GND functions as a return path of the print data signal PData.

The load signal Load which is a differential signal is output by a third output port 130 of the driver module 100 and is input into a third input port 330 of the print head chip 300 through the trace 216 of the connection cable 200, so that the trace 214 that is earthed to the ground GND functions as a return path of the load signal Load. The load signal Load is transmitted to the print head chip 300 through another trace 218 of the connection cable 200, so that a trace 222 of the connection cable 200 that basically transmits a low-speed signal functions as a return path of the load signal Load.

Accordingly, the second multiplexer 150 performs a switching operation so that a trace 220 that transmits the temperature sensing signal T2 which is the low-speed signal can be earthed to the ground GND in response to the load signal Load which is the high-speed signal. When the third output port 130 outputs no signal or a low-speed signal, the second multiplexer 150 is switched on with a terminal capable of receiving the low-speed signal in order to transmit the low-speed signal corresponding to the temperature sensing signal T2 to the print head chip 300.

However, when the third output port 130 outputs the high-speed signal such as the load signal Load, the second multiplexer 150 is switched off with the terminal capable of receiving the low-speed signal and is earthed to the ground GND in order to form a return path of the high-speed signal. If the print head chip 300 receives the switching signal MUX_CTRL indicating that the second multiplexer 150 is earthed to the ground GND through the signal trace 222, the second de-multiplexer 350 included in the print head chip 300 is earthed to the ground GND in response to the switching signal MUX_CTRL. That is, the trace 220 that is earthed to the ground GND functions as a return path of the load signal Load.

Figure 5A:
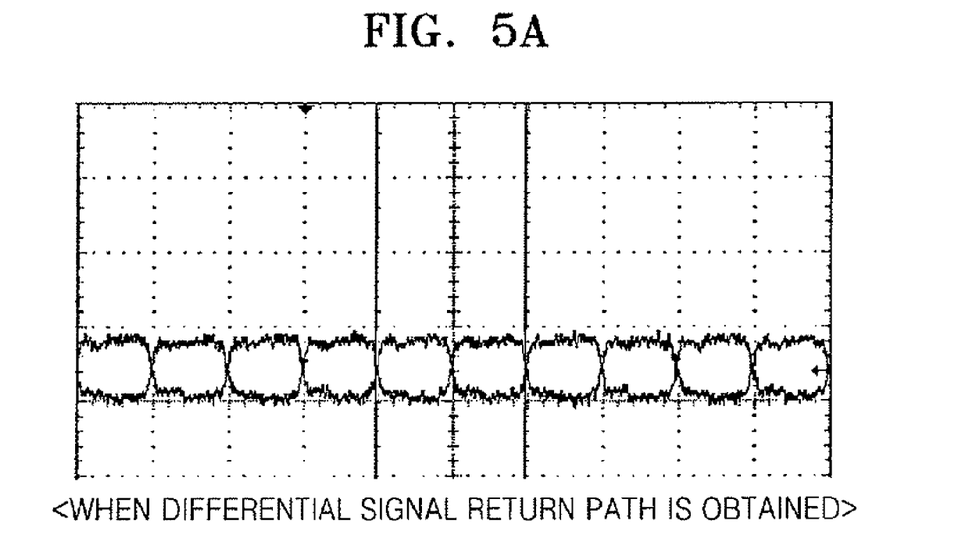
FIGS. 5A and 5B are diagrams of whether signal distortion occurs when a return path is formed and when it is not formed, respectively.
Figure 5B:
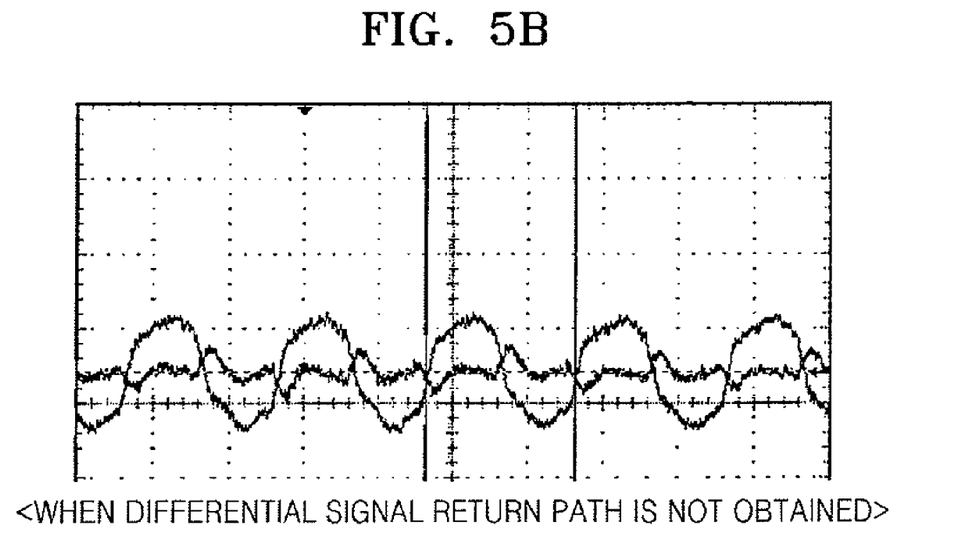

FIGS. 5A and 5B are diagrams of whether signal distortion occurs when a return path is formed and when the return path is not formed, respectively. Referring to FIG. 5A, when the return path is formed, a high-speed signal is transmitted without generating signal distortion. However, referring to FIG. 5B, when the return path is not formed, signal distortion or noise occurs in a signal transmitted.

Figure 6:
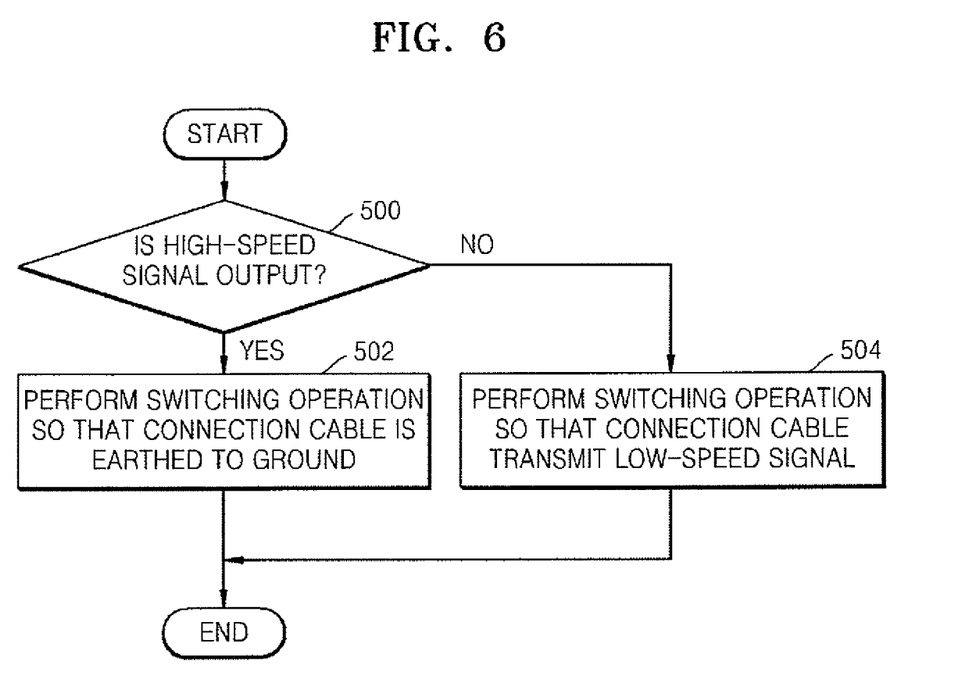
FIG. 6 is a flowchart illustrating a data interfacing method of a print head chip according to an embodiment of the present general inventive concept.

FIG. 6 is a flowchart illustrating a data interfacing method of a print head chip according to an embodiment of the present general inventive concept. The drive module 100 that outputs a low-speed signal with a slow transmission speed and a high-speed signal requiring a fast transmission speed, the connection cable 200 that transmits the low-speed signal and the high-speed signal, and the print head chip 300 that operates in response to the low-speed signal and the high-speed signal transmitted through the connection cable are used to perform the data interfacing method.

It is determined whether the low-speed signal or the high-speed signal is output Operation 500. The determination is made by the drive module 100 in advance. For example, a clock signal CLK, a print data signal PData, and a load signal Load may be set as the high-speed signals. Two temperature sensing signals T1 and T2 and a reset signal Reset may be set as the low-speed signals.

If it is determined that the high-speed signal is output in Operation 500, a switching operation is performed by the first and second multiplexers 140 and 150 and the first and second de-multiplexers 340 and 350 Operation 502, so that the connection cable 200 is earthed to a ground. The connection cable 200 that is earthed to the ground functions as a return path as the high-speed signal. The connection cable 200 that supplies power to the print head chip from the drive module 100 can function as the return path as the high-speed signal.

The print data signal PData or the load signal Load, which is a differential signal, is output by the drive module 100 and is transmitted to the print head chip 300 through a trace of the connection cable 200, so that a trace of the connection cable 200 that transmits the low-speed signal functions as a return path of the print data signal PData or the load signal Load.

Accordingly, the first and second multiplexers 140 and 150 perform switching operations so that the traces 214 and 220 that transmit the temperature sensing signals T1 and T2, which are the low-speed signals, can be earthed to the ground GND in response to the print data signal PData or the load signal Load which is the high-speed signal. If the print head chip 300 receives a switching signal MUX_CTRL indicating that the first and second multiplexers 140 and 150 are earthed to the ground GND through the signal trace 222, the first and second de-multiplexers 340 and 350 included in the print head chip 300 are earthed to the ground GND in response to the switching signal MUX_CTRL. That is, the traces 214 and 220 that are earthed to the ground GND function as return paths of the print data signal PData or the load signal Load.

If it is determined that the low-speed signal is output in Operation 500, a switching operation is performed so that the connection cable 200 can transmit the low-speed signal Operation 504. When the second and third output ports 120 and 130 output no signal or the low-speed signal, the first and second multiplexers 140 and 150 are switched on with a terminal capable of receiving the low-speed signal in order to transmit the low-speed signal corresponding to the temperature sensing signals T1 and T2 to the print head chip 300.

The reset signal Reset corresponding to the low-speed signal is transmitted to the print head chip 300 through the trace 224.

Although a high-speed signal is described as a differential signal in an embodiment of the present general inventive concept, a single-ended signal can be applied using a multiplexer. Although a driver outputs a signal and a head chip inputs the signal in an embodiment of the present general inventive concept, bi-directional interfacing is possible.

As described above, the image forming apparatus can plot an image using distortion-free data enacted according to the above-described data interfacing apparatus.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, the data interfacing apparatus and method of a print head chip of the present general inventive concept form a return path by a ground trace using a multiplexer when a high-speed signal is transmitted, so that signal impedance maintains constant and has an invariable value. Therefore, signal distortion caused by the transmission of the high-speed signal can be reduced and a number of connection cables of an output driver and a print head chip can be reduced, thereby leading to reduction in design costs of a system.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A data interfacing apparatus of a print head chip, comprising:
a drive module to output a low-speed signal with a slow transmission speed and a high-speed signal requiring a fast transmission speed;
a connection cable to transmit the low-speed signal and the high-speed signal; and
a print head chip to operate in response to the low-speed signal and the high-speed signal transmitted through the connection cable,
wherein the drive module comprises multiplexers to perform a switching operation so that the connection cable is earthed to a ground in response to the high-speed signal, and
wherein the print head chip comprises de-multiplexers to perform a switching operation in response to the operation of the multiplexers.

2. The data interfacing apparatus of claim 1, wherein the connection cable that is earthed to the ground functions as a return path of the high-speed signal.

3. The data interfacing apparatus of claim 1, wherein the connection cable that supplies power to the print head chip from the drive module functions as a return path of the high-speed signal.

4. The data interfacing apparatus of claim 1, wherein the drive module outputs a print data signal as the high-speed signal.

5. A data interfacing apparatus, comprising:
a drive module having a port to output a high speed signal, having another port to output a ground signal according to a first state of the high speed signal of the port and the drive module to output a low speed signal according to a second state of the high speed signal of the port, such that a return current path is formed, and having a control port to output a control signal indicating one of the ground signal and the low speed signal of the other port.

6. A data interfacing apparatus, comprising:
a print head chip having a port to receive a high speed signal, having another port to receive a ground signal according to a first state of the high speed signal and to receive a low speed signal according to a second state of the high speed signal of the port, such that a return current path is formed, and having a control port to receive a control signal to cause the print head chip to couple one of the ground signal and the low speed signal to the other port.

7. A data interfacing apparatus, comprising:
a drive module having a plurality of ports to generate a high speed signal, and the drive module to selectively generate a ground signal and a low speed signal to form a return current path with the high speed signal in response to the high speed signal;
a print head chip having a plurality of ports to receive the high speed signal and one of the ground signal and the low speed signal from respective ones of the plurality of drive module ports; and
a cable having a plurality of traces to connect corresponding ones of the plurality of ports of the drive module and the print head chip.

8. The apparatus of claim 7, wherein;
the drive module comprises a control port to generate a control signal indicating generating of one of a ground signal and a low speed signal of at least one of the plurality of drive module ports according to a state of the high speed signal; and the print head chip comprises another control port to receive the control signal.

9. The apparatus of claim 7, wherein;

the drive module comprises a multiplexer to select one of the ground signal and the low speed signal according to a state of the high speed signal; and the print head chip comprises a de-multiplexer to receive the one of the ground signal and the low speed signal.

10. A data interfacing apparatus, comprising:

a drive module to output a low-speed signal with a slow transmission speed and a high-speed signal with a fast transmission speed wherein the drive module performs a first switching operation in response to the high-speed signal;

a connection cable to transmit the low-speed signal and the high-speed signal wherein the connection cable is earthed to a ground during the first switching operation; and a print head chip to perform a second switching operation in response to the first switching operation.

11. The apparatus of claim 10, wherein the print head chip operates in response to the low-speed signal and the high-speed signal transmitted through the connection cable.

12. The apparatus of claim 10, wherein the drive module comprises multiplexers to perform the first switching and the print head chip comprises de-multiplexers to perform the second switching operation.

13. The apparatus of claim 10, wherein the connection cable functions as a first return path of the high speed signal when the connection cable is earthed to the ground, and functions as a second return path of the high speed signal when the connection cable supplies power to the print head chip.

14. The apparatus of claim 10, wherein the drive module determines in advance whether the high-speed output signal or the low speed signal was output.

15. The apparatus of claim 14, wherein the drive module performs a third switching operation to transmit the low-speed signal if it is determined that the low-speed signal is output.

16. A drive module usable with a printhead chip, comprising:

a first port to output a high speed signal to the printhead chip; and a second port to selectively output a ground signal and a low-speed signal to the printhead chip, wherein the drive module switches the second port to the ground signal in response to the high-speed signal of the first port.

17. The drive module of claim 16, wherein the second port switches to the low-speed signal in response to a low-speed signal or no signal output by the first port.

18. The drive module of claim 16, further comprising a multiplexer to select between the ground signal and the low-speed signal according to a state of the high speed signal.

* * * * *